Oct. 1, 1968
G. H. LABRIE
3,404,340
IMPLEMENT FOR SELECTIVELY DISLODGING A SINGLE ELECTRICAL
WIRE FROM A BUNDLE OF INSULATED ELECTRICAL WIRES
AND CIRCUIT TESTING THE SAME
Filed Feb. 11, 1966
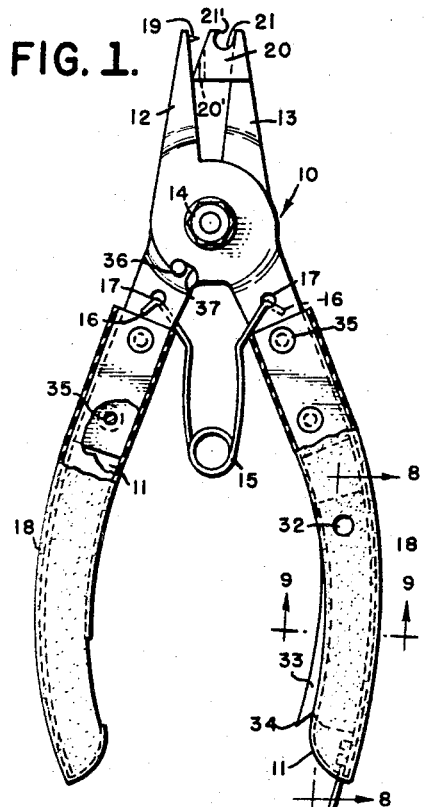
FIG. 1.
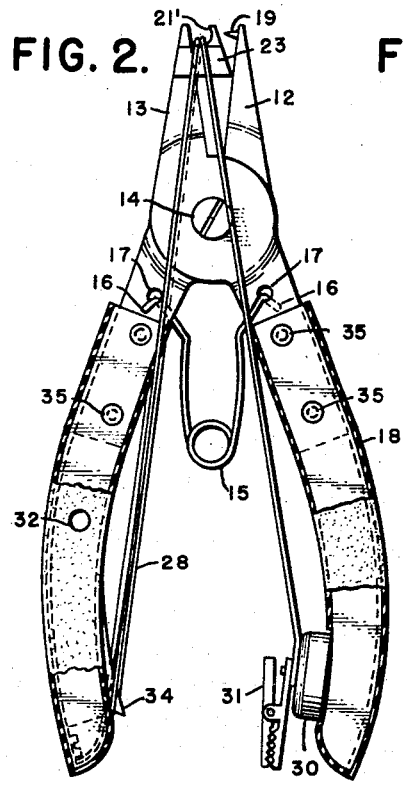
FIG. 2.
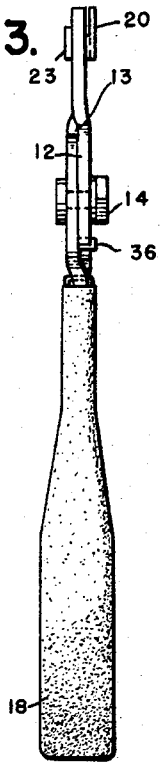
FIG. 3.
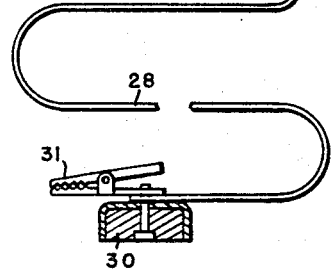
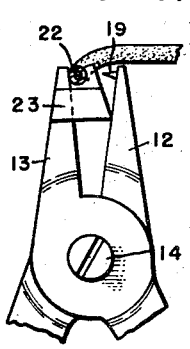
FIG. 4.
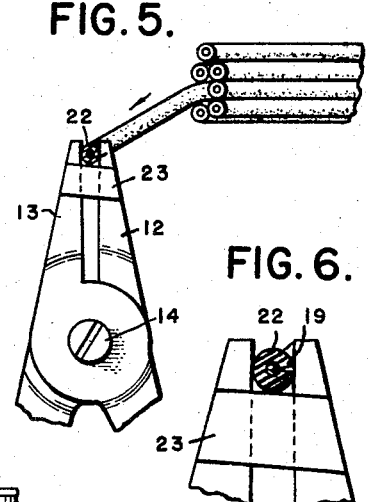
FIG. 5.
FIG. 6.
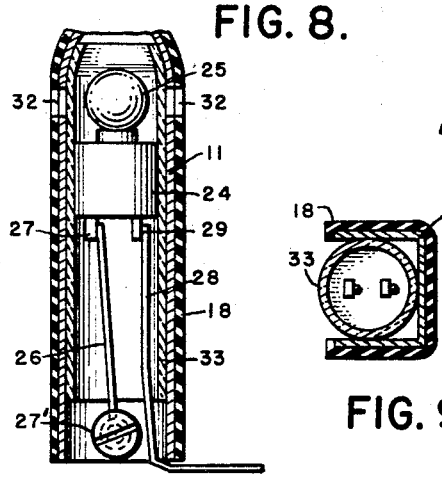
FIG. 8.
FIG. 7.
FIG. 9.
INVENTOR
GERALD H. LABRIE
BY *Schlesinger, Arkwright & Garvey*
ATTORNEYS

United States Patent Office 3,404,340
Patented Oct. 1, 1968

3,404,340
IMPLEMENT FOR SELECTIVELY DISLODGING A SINGLE ELECTRICAL WIRE FROM A BUNDLE OF INSULATED ELECTRICAL WIRES AND CIRCUIT TESTING THE SAME
Gerald H. Labrie, North Dartmouth, Mass., assignor to Labrie & Labrie Associates, North Dartmouth, Mass.
Filed Feb. 11, 1966, Ser. No. 526,787
8 Claims. (Cl. 324—72.5)

ABSTRACT OF THE DISCLOSURE

An implement for selectively dislodging a single electrical wire from a bundle of insulated electrical wires and circuit testing the same, including pivotally connected spring-loaded handles with jaws at one end, probe means carried by one of the jaws adjacent a terminal thereof, the probe means being in opposed relation to the other of the jaws, a supporting saddle plate mounted on a lateral extremity of the other jaw and extending towards the first jaw, the upper edge of the saddle plate being centrally recessed to form an arcuate pocket for reception of an insulated electrical wire, the upper edge of the wall defining the recess being provided with an inwardly directed extension forming a hook for dislodging a single wire from the bundle of wires, a lamp mounted in one of the handles and in electrical connection with the probe means, and ground means in circuit with the lamp.

---

The present invention is an implement for selectively dislodging a single electrical wire from a bundle of insulated electrical wires and circuit testing the same.

In locating and picking proper electrical lead wires from a bundle of wires, it has heretofore been conventional procedure to first use a sharp pointed probing tool to locate the proper wire, followed by extracting the wire from the bundle with pliers or the like. When this wire is to be used in connection with an electrical "hook up," such as in the attachment of stop, running and directional signal lights of a trailer to an automobile, plugging means are then attached to the wire. During this procedure, involving the use of several tools, it is difficult to keep track of the proper wire to be used, as a result of which there is danger that an improper wiring connection may be made.

It is an object of the present invention to provide an implement capable of working in extremely close quarters to engage a wire, the implement including a probing pin for piercing the insulation of the wire and electrically testing the wire and further being provided with means for pulling the proper wire from the bundle of wires after testing, without releasing the wire, and permitting connection of the wire to plugging means, thereby precluding improper wiring connections.

Another object is to provide a spring-loaded, plier-like implement having means in one jaw for supporting and retaining the insulated wire to be tested, the other jaw being equipped with a probing pin, the implement further including an illuminating agent in a handle for visually indicating completion of a circuit.

A further object is to provide an implement of the character described wherein one of the jaws is provided with a saddle for receiving and retaining an electrical wire during the testing and pulling of the wire from a bundle of wires, the saddle further serving to permit ready extraction of the probing member from the insulated wire without manual aid of the user, and without undue damage to the insulation material.

Other objects of the invention will be manifest from the following description of the present preferred form of the invention, taken in connection with the accompanying drawings, wherein:

FIG. 1 is a side elevational view of an implement constructed in accordance with this invention, showing the jaws open;

FIG. 2 is a similar view looking at the other side of the implement showing the grounding cable supported in the saddle of one of the jaws when the implement is not in use;

FIG. 3 is an edge elevational view of the implement;

FIG. 4 is a fragmentary side elevational view similar to FIG. 2 with an insulated wire supported in the saddle and the probing means in the opposite jaw in a position to be pushed into the insulated wire when the jaw is closed;

FIG. 5 is a view similar to FIG. 4, showing the jaw in closed position, with the probing pin in contact with the wire, FIG. 5 also including loops of insulated wire in position to be engaged with the implement;

FIG. 6 is a view similar to FIG. 5, looking at the other side of the implement and showing the insulated wire supported on the guide plate in parallel relation to the saddle;

FIG. 7 is a fragmentary sectional view of the outer ends of the jaws in open position showing the location of the probing pin between the saddle and guide plate when the jaws are in an open position;

FIG. 8 is a longitudinal fragmentary sectional view taken through one of the jaw handles on the line 8—8 of FIG. 1, looking in the direction of the arrows; and FIG. 9 is a horizontal sectional view taken on the lines 9—9 of FIG. 1, looking in the direction of the arrows.

The implement of this invention generally designated 10 is of plier-like construction including a pair of handles 11 with jaws 12 and 13, the handles being crossed adjacent the jaws and pivotally engaged as indicated at 14. The handles are spring-loaded as indicated at 15, the ends 16 of the spring extending through complemental openings 17. The handles are covered with insulation 18. Other metallic part of the implement may also be covered with insulating material.

The jaw 12 carries probing means 19 which may consist of a single pin which projects from the inner wall of the jaw 12 adjacent its extreme outer end. The pin is preferably of small diameter in the order of 0.020 inch and of good electrical conducting means such as hardened steel, and sharpened to a needle point, for easily penetrating insulation materials, regardless of composition. The jaw 13 carries a supporting saddle 20 which comprises a plate fixedly secured to a side wall of said jaw, and extend towards jaw 12. The saddle is preferably of the approximate shape shown in thed rawings and has its upper edge centrally recessed to improve an arcuate pocket, as indicated at 21, for the reception of an insulated electric wire 22, as shown in FIG. 4. In addition, the upper inner edge of the wall defining the recess is extended inwardly to provide a hook 21' used to facilitate dislodging a single wire from a bundle of wires. The lower inside edge of the saddle plate is bent inwardly to provide an abutment lug 20' to insure accurate position of the jaw carrying the probing means, as illustrated to advantage in FIG. 7.

It will be noted especially on reference to FIGS. 2 and 4 of the drawings, that when the jaws are open, the lower inner edge of the saddle spans the distance between the jaws. Jaw 13 also has fixedly secured thereto, a guide plate 23 which is arranged in parallel relation to the saddle 20 and extends completely across the jaw 12 when the jaws are in a closed position, as shown FIG. 5.

Handles 11 of implement 10 are concave, one of which handles is equipped with an electrical socket 24 adapted for the reception of a lamp 25 of suitable voltage. A wire 26 is in circuit with socket 24, as indicated at 27, and extends to the terminal portion of the handle where it is electrically and mechanically connected to the handle by a screw or rivet 27'. A second electric wire 28 of suitable length is in circuit with socket 24 at 29. A magnet 30 and alligator clip 31 are connected to the free terminal of wire 28 and are selectively engaged with a ground or negative connection in order to complete the circuit being tested, causing lamp 25 to glow. Circular openings 32 in handle 11 and insulation 18, at the locus of signal lamp 25 facilitate visibility of illuminated lamp 25. Also, placement of lamp 25 within handle 11 protects the same from damage. Additionally, socket 24 and lamp 25 are protected by a tubular translucent member 33 which is placed over the lamp. The lower terminal of member 33 is formed to provide a hook 34 with which a portion of wire 28 may be engaged when the implement is not in use, as shown in FIG. 2.

It is within the contemplation of the present invention to make the plier-like implement of any suitable electrical conducting material, the handles 11 of which are preferably connected to jaws 12 and 13 by rivets, as indicated at 35. Additionally, in order to prevent probing pin 19 from passing completely through the tested wire, the implement is equipped with a mechanical stop. This stop includes a lug or protuberance 36 extending from a face of jaw 13 lying within an arcuate recess of jaw 12. As shown in FIG. 6, this stop permits movement of probing pin 19 to a predetermined point spaced from jaw 13, to prevent the probing pin from extending completely through insulated electrical wire 22.

In use, magnet 30 or alligator clip 31 is first engaged with a suitable ground. The jaws of the implement are then inserted into the bundle of electrical insulated wires and a selected wire is positioned in pocket 21 of saddle 20. Handles 11 are then urged towards each other, effecting movement of jaw 12 between saddle 20 and guide plate 23. This moves probing pin 19 into penetrating engagement with a wire 28. If the correct wire has been selected, lamp 25 will glow. This wire may then be extracted from the bundle of wires by pulling on the same, pocket 21 and hook 21' serving to retain the wire in saddle 20 while it is being extracted. Upon release of handles 11, the tension of spring 15 urges jaws 12 and 13 apart, thereby causing probing pin 19 to be withdrawn from the wire.

With the present invention, a single implement is provided for both electrically testing a wire and pulling it from a bundle of wires, the implement being operated by one hand of the user. The present device is also economical to manufacture, requiring no complicated or hard to manufacture parts and is very efficient in operation.

While there has been herein shown and described a preferred form of the present invention, it is to be understood that such has been done for purposes of illustration only, and that various changes may be made therein, within the scope of the claims hereto appended.

I claim:
1. An implement for selectively dislodging a single electrical wire from a bundle of insulated electrical wires and circuit testing the same, including:
   (a) a pair of handles,
   (b) jaws issuing from said handles,
   (c) said handles being crossed adjacent the jaws and pivotally connected to each other at the point of crossing,
   (d) probe means carried by one of said jaws adjacent a terminal thereof,
   (e) said probe means being in opposed relation to the other of said jaws,
   (f) a supporting saddle plate mounted on a lateral extremity of said other jaw and extending towards said first jaw,
   (g) the upper edge of said saddle plate being centrally recessed to form an arcuate pocket for the reception of an insulated electrical wire,
   (h) the upper edge of the wall defining the recess being provided with an inward extension of the upward inner edge of the wall of said saddle plate defining a hook to facilitate dislodging a single wire from the bundle of wires,
   (i) signal means mounted in one of said handles,
   (j) said signal means being in electrical connection with said probe means, and
   (k) ground means in circuit with said signal means.
2. The implement of claim 1, wherein
   (a) said signal means comprises a lamp.
3. The implement of claim 1, with the addition of
   (a) a guide plate fixed to a lateral extremity of said other jaw in opposed relation to said saddle plate.
4. The implement of claim 1, with the addition of
   (a) an inwardly directed abutment lug carried by said saddle plate for engagement with the opposed jaw to insure accurate positioning of said probe means for positive engagement of the latter with the center of the wire.
5. The implement of claim 1 with the addition of
   (a) stop means on said jaws for preventing movement of said probe means completely through the wire being tested,
   (b) said stop means including an elongated recess in one of said jaws,
   (c) a lug in said other jaw extending into the elongated recess,
   (d) said lug and recess limiting the relative movement of one jaw with respect to the other.
6. The implement of claim 1 wherein
   (a) said probe means comprises a pin.
7. An implement for selectively dislodging a single electrical wire from a bundle of insulated electrical wires and circuit testing the same, including
   (a) a pair of handles,
   (b) jaws issuing from said handles,
   (c) said handles being crossed adjacent the jaws and pivotally connected to each other at the point of crossing,
   (d) a probing pin carried by one of said jaws adjacent a terminal thereof,
   (e) said probing pin lying in opposed relation to the other of said jaws,
   (f) a supporting saddle plate mounted on a lateral extremity of said other jaw and extending towards said first jaw,
   (g) the upper edge of said saddle plate being centrally recessed to form an arcuate pocket for the reception of an insulated electrical wire,
   (h) the upper edge of the wall defining the recess being provided with an inwardly directed extension forming a hook for dislodging a single wire from the bundle of wires,
   (i) a lamp mounted in one of said handles,
   (j) said lamp being in electrical connection with said probing pin, and
   (k) ground means in circuit with said lamp.
8. The implement of claim 7, with the addition of
   (a) a guide plate fixed to a lateral extremity of said other jaw in opposed relation to said saddle plate.

References Cited

UNITED STATES PATENTS

| 1,738,287 | 12/1929 | Dirksen | 324—51 |
| 3,267,452 | 8/1966 | Wolf | 339—108 XR |

FOREIGN PATENTS

| 249,239 | 6/1947 | Switzerland. |
| 719,796 | 3/1942 | Germany. |

RUDOLPH V. ROLINEC, *Primary Examiner.*

E. L. STOLARUN, *Assistant Examiner.*